United States Patent [19]

Wheeler

[11] 4,047,308

[45] Sept. 13, 1977

[54] COACHES FIELD ANALYSIS KIT

[76] Inventor: Anthony A. Wheeler, 18784 Bainbury St., Canyon Country, Calif. 91351

[21] Appl. No.: 664,005

[22] Filed: Mar. 4, 1976

[51] Int. Cl.² .............................................. A63B 71/02
[52] U.S. Cl. .................................................... 35/29 R
[58] Field of Search ............. 35/7 R, 7 A, 29 R, 29 C

[56] References Cited

U.S. PATENT DOCUMENTS

| 2,158,368 | 5/1939 | Hurt | 35/29 R |
| 2,158,475 | 5/1939 | Montine | 35/29 C |
| 2,643,466 | 6/1953 | Bucher | 35/29 R X |
| 3,340,621 | 9/1967 | Snyder | 35/29 R |

FOREIGN PATENT DOCUMENTS 284,869  2/1928  United Kingdom ................ 35/29 C Primary Examiner—Harland S. Skogquist
Attorney, Agent, or Firm—Clarence A. O'Brien; Harvey B. Jacobson

[57] ABSTRACT

A kit for use by a coach or coaches on a regulation football playing field during formation and play analysis and for teaching players formations and plays has a plurality of elements forming sets symbolizing an offensive unit, a defensive unit, and route patterns. The elements are placeable directly on a regulation playing field to assist in setting up offensive and defensive formations and sets.

1 Claim, 4 Drawing Figures

U.S. Patent         Sept. 13, 1977         4,047,308
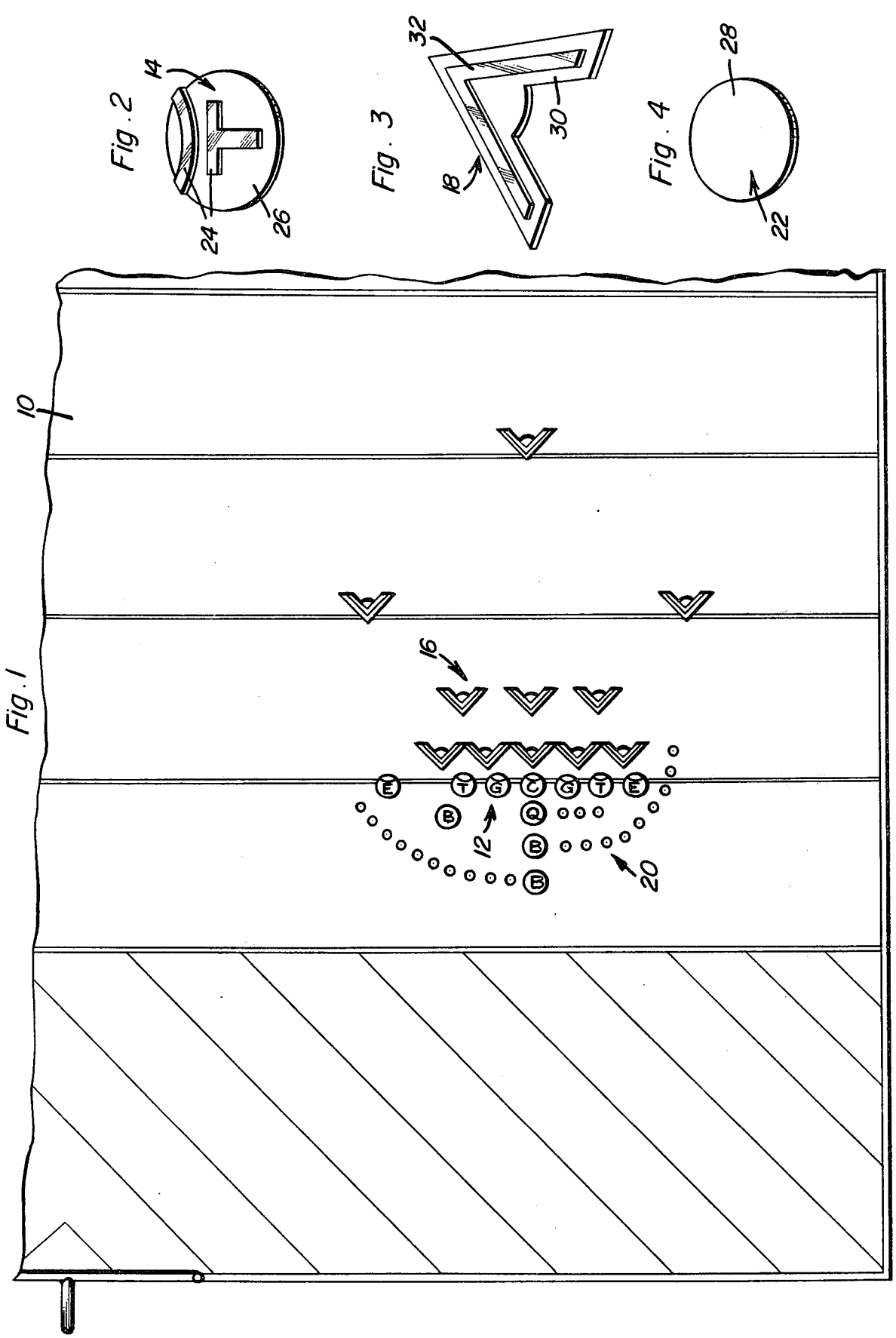

COACHES FIELD ANALYSIS KIT

BACKGROUND OF THE INVENTION

1. Field of the Invention

This invention relates generally to instruction and analyzing aids, and particularly to football play analyzing and teaching devices. 2. Description of the Prior Art It is generally known to use devices and symbols on a regulation football field, and the like, to assist coaches in instructing their players. U.S. Pat. No. 1,538,203, issued May 19, 1925, to C. B. Moran, shows the use of wire-guided dummies for this purpose, while U.S. Pat. No. 2,458,984, issued Jan. 11, 1949, to C. A. Engle, discloses the use of a strip placeable on a playing field to show the position of the offensive linemen during practice of the offensive backs. In the former, however, the players cannot be in position on the field while the dummies are in place, and in the latter, only the offensive backs are on the field running through plays.

It is also known to use simulated playing fields, usually of tabletop size, to diagram football plays. Examples of these educational devices and amusements are found in U.S. Pat. Nos. 1,927,695, issued Sept. 19 1933, to L. P. Andreas; U.S. Pat. No. 2,149,325, issued Mar. 7, 1939, to A. B. White; U.S. Pat. No. 2,158,368, issued May 16, 1939. to V. C. Hurt; U.S. Pat. No. 2,579,105, issued Dec. 18, 1951, to J. J. Baldine; and U.S. Pat. No. 2,946,134, issued July 26, 1960, to R. D. Neilson. A principal difficulty with these devices, however, is that their reduced size obviously prohibts the players from being on the field simultaneously with the teaching and analyzing devices.

SUMMARY OF THE INVENTION

It is an object of the present invention to provide a football practice apparatus which permits the player to be on a regulation football field, or other suitable practice facility, simultaneously with symbols representing the positions of the players and route patterns of the plays.

It is another object of the present invention to provide football practice, player position indicating symbols which can readily moved about a regulation playing surface.

These and other objects are achieved, according to the present invention, by providing a kit including a plurality of elements forming first and second sets of elements, with each of the sets including elements of a common configuration, and one of the first and second sets representing an offensive football unit and the other representing a defensive football unit. A third set of elements is advantageously provided for representing route patterns of plays being run.

These together with other objects and advantages which will become subsequently apparent reside in the details of construction and operation as more fully hereinafter described and claimed, reference being has to the accompanying drawings forming a part hereof, wherein like numerals refer to like parts throughout.

BRIEF DESCRIPTION OF THE DRAWINGS

FIG. 1 is a fragmentary, schematic view showing football formation and play analyzing and teaching elements arranged on a portion of a regulation ball playing field.

FIGS. 2, 3 and 4 are perspective, detailed views, each showing an example of the elements which form a football coaches field analysis kit according to the present invention.

DESCRIPTION OF THE PREFERRED EMBODIMENTS

Referring now more particularly to the figures of the drawing, a kit, according to the present invention, is shown disposed on a regulation football playing field 10, and the like. As can be readily appreciated from FIG. 1, the kit includes a plurality of elements forming a first set 12 comprising a plurality of offensive player representing elements 14 (FIG. 2), a second set 16 comprising a plurality of defensive player representing elements 18 (FIG. 3), and preferably a third set 20 comprising a plurality of elements 22 (FIG. 4) representing route pattern of plays being analyzed and taught.

As can be appreciated, the elements 14 of first set 12 and the elements 18 of second set 16 advantageously are in number at least equivalent to the number of players in each of the offensive and defensive units represented by the sets 12 and 16. For example, if these units comprise the usual eleven members, there will be eleven elements 14 and eleven elements 18 in the respective sets 12 and 16. While the number of route spots formed by the elements 22 may vary, twenty of such elements 22 has been found satisfactory for use in routing the patterns employed in various plays.

Taking FIG. 2 together with FIG. 1, it will be seen that each of the elements 14 of the offensive football unit representing set 12 is provided with indicia generally designated 24 for denoting a specific offensive footable position such as an offensive tackle. For this purpose, the element 14 shown in FIG. 2 has provided thereon a large block "T" to symbolize the offensive tackle position. The arcuate design also provided on the element 14 shown in FIG. 2 can designate the direction in which is headed the player represented by the element 14. Elements 14 representing other offensive positions can have corresponding letters and designs as appropriate. For example, the running backs may also be provided with direction arrows (not shown) in order to clearly designate the direction in which a particular back is moving. While the letters and designs may be placed on elements 14 in any desired and suitable manner, one preferred manner of placing these letters and designs on the elements 14 is to raise them above the main body portion of the associated element in the manner of embossing.

Elements 14 and 22 are advantageously in the form of the illustrated disks 26 and 28, with the disk 26 being substantially larger than the disk 28. One advantage realized by making both elements 14 and 22 of circular configuration is that the elements 14 which are not needed at a particular time in the analysis and diagramming of a play can be turned over so as to present a planar face and be used as route spots together with the elements 22.

As can best be seen from FIG. 3, elements 18 each comprise a body member 30 in the form of a "V". The apex of the body member 30 is intended to point in the direction in which the player represented by element 18 is intended to be facing. Each element 18 can have a V-shaped portion 32 advantageously disposed in raised relation on body member 30 and oriented so as to diverge with the body member 30. That is, the apex of portion 32 should corresponding generally to the apex of body member 30.

As will be appreciated from the above description and from the drawings, a football coaches field analysis kit according to the present invention provides a simple, yet versatile aid which coaches can set up prior to practice on a playing field. While only a single kit is required, it will be understood that several kits can be used on a single playing field to diagram different plays for different groups of participants. A group of players could move from kit-to-kit when practicing plays. Further, while each kit is intended primarily for analyzing and diagramming various football sets and plays, it will be appreciated that they can also be used to set up lanes for all types of drills involving backs and linemen.

Although the dimensions of the various elements 14, 18, 22 may vary as desired, it has been found satisfactory to construct elements 14 approximately 7 inches in diameter, elements 18 approximately 11 ×9 inches, and elements 22 approximately 5 inches in diameter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A kit for use by a coach on a regulation playing surface in position and play analysis for teaching players positions and plays, the kit comprising a plurality of two different elements forming a first set of elements and a second set of elements, the first set representing an offensive unit and the second set representing a defensive unit, with the elements of the second set each including a body member in the shape of a V and forming direction arrows arrangeable indicating on the playing surface directions of players, with the elements of the first set representing an offensive football unit and being circular disks provided with indicia including raised letters denoting a specific offensive football position and raised designs indicating the direction the player is headed, and the elements of the second set additionally each having a portion of V-shape formed in raised relation on the body member and arranged in conformity with the shape of the body member.

* * * * *